United States Patent
Bailly et al.

[11] Patent Number: 5,995,619
[45] Date of Patent: Nov. 30, 1999

[54] TELEPHONY DEVICE WITH COMPENSATION FOR LINE LOSSES

[75] Inventors: Patrick Bailly; Dominique Delbecq, both of Caen, France

[73] Assignee: U.S. Philips Corporation, New York, N.Y.

[21] Appl. No.: 08/993,131

[22] Filed: Dec. 18, 1997

[30] Foreign Application Priority Data

Dec. 31, 1996 [FR] France .................................... 96 16261

[51] Int. Cl.$^6$ ........................................................ H04M 1/00
[52] U.S. Cl. ........................... 379/390; 379/394; 379/395
[58] Field of Search ..................................... 379/387, 388, 379/389, 390, 391, 392, 394, 395, 400, 401, 402, 403, 404; 330/252, 254, 256, 257, 278, 284, 253

[56] References Cited

U.S. PATENT DOCUMENTS

| | | | |
|---|---|---|---|
| 4,453,038 | 6/1984 | Eberhardt et al. | 379/395 |
| 4,515,996 | 5/1985 | Burgin | 379/394 |
| 4,726,062 | 2/1988 | Martz et al. | 379/390 |
| 5,278,518 | 1/1994 | Debroux | 330/279 |
| 5,471,170 | 11/1995 | Genest | 330/151 |
| 5,471,527 | 11/1995 | Ho et al. | 379/400 |
| 5,483,194 | 1/1996 | Genest | 330/253 |
| 5,818,905 | 10/1998 | Ohno | 379/30 |

FOREIGN PATENT DOCUMENTS

0102660A2  3/1984  European Pat. Off. .

*Primary Examiner*—Jack Chiang
*Attorney, Agent, or Firm*—Jack D. Slobod

[57] ABSTRACT

A telephony device includes a rectifier bridge (GB) intended to be connected to a telephone line and to supply a rectified line current, an interface module (INT) permitting the transmission of signals in the direction of the telephone line and supplying an information signal (Iin), and an amplifier (AGC) whose gain is proportional to the value of a control current (Icnt) supplied by a control module (CNT). The control current (Icnt) is proportional to an exponential of a linear equation of the inverse of the value of the information signal (Iin) in order to compensate for the attenuation which the signal has undergone during its transport through the telephone line. The control module is formed by a translinear module (TRL) which receives the input signal (Iin) and produces a translinear current (Itr) whose value may be expressed in the form of a linear equation of the inverse value of the input signal (Iin), and an exponential module (EXP) which receives the translinear current (Itr) and produces the control current (Icnt) whose value may be expressed as proportional to an exponential of the value of the translinear current (Itr).

6 Claims, 2 Drawing Sheets

5,995,619

TELEPHONY DEVICE WITH COMPENSATION FOR LINE LOSSES

FIELD OF THE INVENTION

The present invention relates to a telephony device comprising:
- a rectifier bridge having two terminals called alternating terminals intended to be connected to a telephone line, a first and a second terminal called DC terminals intended to supply and receive respectively, a rectified current called line current,
- an interface module connected between the DC terminals of the rectifier bridge, having at least one input intended to receive a signal to be transmitted in the direction of the telephone line, and an output intended to supply an information signal whose value represents the mean value of the line current, and
- an amplifier having a signal input intended to receive a signal to be transmitted to the telephone line, an output connected to the input of the interface module and a control input intended to receive a control signal, the value of the gain of the amplifier being proportional to that of said control signal.

BACKGROUND OF THE INVENTION

In many known telephony devices, an amplifier whose function is to amplify the transmit signal in order to compensate for the losses which will be caused by the transport of said signal through the telephone line, receives the information signal coming from the interface module directly. The gain of the amplifier is then proportional to the mean value of the line current. However, the attenuation of the signal caused by the telephone line is not linear in relation to the length of said line and thus in relation to the mean value of the line current. It is known to be of the order of 1.2 dB/km and may be expressed in the form:

$$A(V/V) = K1 \cdot exp(-((K2/Iin) - K3)),$$

where $A(V/V)$ is the attenuation of the signal, $K1$ is a multiplying constant, $K2$ and $K3$ are constants whose values are intrinsic to the line and are respectively of the order of 0.033 and 0.497, and $Iin$ is the mean value of the line current. A linear compensation by means of an amplification whose gain is proportional to the mean value of the line current is thus not perfect and gives rise to variations of the sound level depending on the length of the telephone line.

It is an object of the present invention to remedy this drawback by proposing a telephony device in which the equation which defines the value of the gain of the amplifier is the reverse to that which defines the attenuation of the signal brought about by the line.

SUMMARY OF THE INVENTION

Indeed, according to the present invention, a telephony device as described in the opening paragraph is characterized in that it further comprises a module called control module which has an input intended to receive an input signal and connected to the output of the interface module, and an output connected to the control input of the amplifier, said output being intended to supply a signal whose value may be expressed proportionally to the exponential of a linear equation of the inverse of the input signal value.

Thus, the control module supplies a signal whose value is expressed as $Icnt = K \cdot exp((K'2/Iin) - K'3)$. The gain of the amplifier being proportional to this value, the amplification to which the transmit signal will be subjected will have the form:

$$G(V/V) = K'1 \cdot exp((K'2/Iin) - K'3),$$

where $G(V/V)$ represents the ratio between the output voltage of the amplifier and its input voltage. The values of $K'1$, $K'2$ and $K'3$ depend on the design of the elements forming the control module and the amplifier and may thus be chosen so that the value obtained for the gain is the inverse of the attenuation value. For example, $K'1 = 1/K1$, $K'2 = K2$ and $K'3 = K3$ can be chosen, which immediately results in $G(V/V) = 1/A(V/V)$.

The control module may be implemented in various manners. One of these implementation features a structure which is interesting for its simplicity and its economic use of space. This particular embodiment of the invention is characterized in that the control module comprises:
- a module called translinear module, having an input which forms the input of the control module, and an output intended to produce a signal called translinear signal whose value may be expressed in the form of a linear equation of the inverse of the value of the input signal, and
- a module called exponential module, having an input intended to receive the translinear signal, and an output forming the output of the control module which output is intended to supply a signal whose value may be expressed proportionally to the exponential of the value of the translinear signal.

The breaking up of the control module into translinear and exponential modules enables separately performing two elementary functions, the output signal of the translinear module having the form $Itr = (K'2/Iin) - K'3$, the output signal of the exponential module having the form $Icnt = K \cdot exp(Itr)$. The single coupling between these two modules enables combining their functions and obtaining the desired complex function. Indeed, the gain of the amplifier being proportional to the value of the control current which is produced by the exponential module, this gain thus has the form of $G(V/V) = K'1 \cdot exp((K'2/Iin) - K'3)$.

An embodiment of the translinear module is characterized in that it comprises a first and a second transistor arranged as a differential pair, and a third and a fourth transistor arranged as a differential pair, the collectors of the first and third transistors forming the input and output respectively, of the translinear module, the collectors of the second and fourth transistors being connected to a first and a second current source respectively, the collector of the third transistor being further connected to a third current source, the bases of the first and fourth transistors being connected together to the collector of the fourth transistor, the bases of the second and third transistors being connected together to the collector of the second transistor.

If $Iin$ is the value of the input current of this translinear module and if $Ia$, $Ib$ and $Ic$ are the values of the currents supplied by the first, second and third current sources respectively, it will be demonstrated hereinafter that the value of the current produced on the output of such a translinear module may be expressed as $Itr = (Ia \cdot Ib/Iin) - Ic$, which indeed corresponds to the equation searched for.

An embodiment of the exponential module is characterized in that it comprises two transistors whose emitters are connected to the terminals of a resistor, one of the terminals forming the input of the exponential module, the other terminal being connected to a fixed-potential terminal, the bases of the transistors being collectively connected to the collector of one of the transistors whose collector and emitter are connected to two current sources intended to supply currents which have the same nominal value, the collector of the other transistor forming the output of the exponential module.

If Itr is the input current of this exponential module and if Id is the nominal value of the current supplied by the two current sources, and R the value of the resistance, it will be demonstrated in the following of the exposé that the value of the current produced on the output of such an exponential module may be expressed in the form Icnt=Id.exp(R.Itr/Vt), where Vt=k.T/q, k being the Boltzmann constant, T the absolute temperature and q the load of the electron, which indeed corresponds to the equation searched for.

The combination of the two modules, the exponential module receiving on its input the translinear current, thus enables obtaining a current having the form of Icnt=Id.exp(R.((Ia.Ib/Iin)−Ic)/Vt) on the output of the exponential module. Vt introduces a dependence on temperature, which may advantageously be eliminated. A preferred embodiment of the invention is thus characterized in that the third current source and one of the first and second current sources of the translinear module are arranged for supplying a current whose value is proportional to the value of the absolute temperature to which they are subjected.

These and other aspects of the invention will be apparent from and elucidated with reference to the embodiments described hereinafter.

DETAILED DESCRIPTION OF PREFERRED EMBODIMENTS

Figure 1:
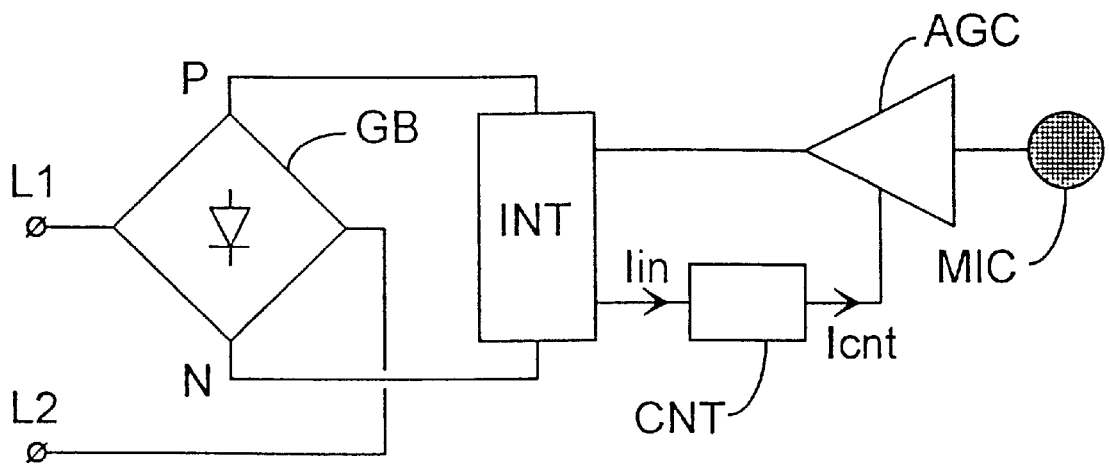
FIG. 1 presents an electric circuit diagram partly describing a telephony device according to the invention.

FIG. 1 partially represents a telephony device according to the invention. This telephony device comprises:

- a rectifier bridge GB, having two terminals L1 and L2 called alternative terminals intended to be connected to a telephone line, a first and a second terminal P and N called DC terminals intended to supply and receive a rectified current called line current,
- a module INT called interface module, connected between the DC terminals P and N of the rectifier bridge GB and having at least an input intended to receive a signal to be transmitted in the direction of the telephone line, and an output intended to supply an information current Iin whose value represents the mean value of the line current, and
- an amplifier AGC, having a signal input intended to receive a signal to be transmitted to the telephone line, which signal may come from a microphone MIC, having an output connected to the input of the interface module INT and having a control input intended to receive a control current Icnt, the value of the gain of the amplifier being proportional to that of said control current Icnt.

This telephony device further comprises a control module CNT, having an input intended to receive the information current Iin and connected to the output of the interface module INT, and having an output connected to the control input of the amplifier AGC, said output of the control module CNT being intended to supply a current Icnt whose value may be expressed in a form proportional to the exponential of a linear equation of the inverse value of the information signal Iin, that is to say, Icnt=K.exp((K'2/Iin)−K'3). The gain G(V/V) of the amplifier AGC, which is proportional to the value of the control current Icnt, is thus written as G(V/V)=K'1.exp((K'2/Iin)−K'3). By properly choosing the parameters K'1, K'2, and K'3, the amplification obtained by the amplifier AGC makes it possible to compensate for the attenuation the transmit signal is subjected to during its transport through the telephone line.

Figure 2:
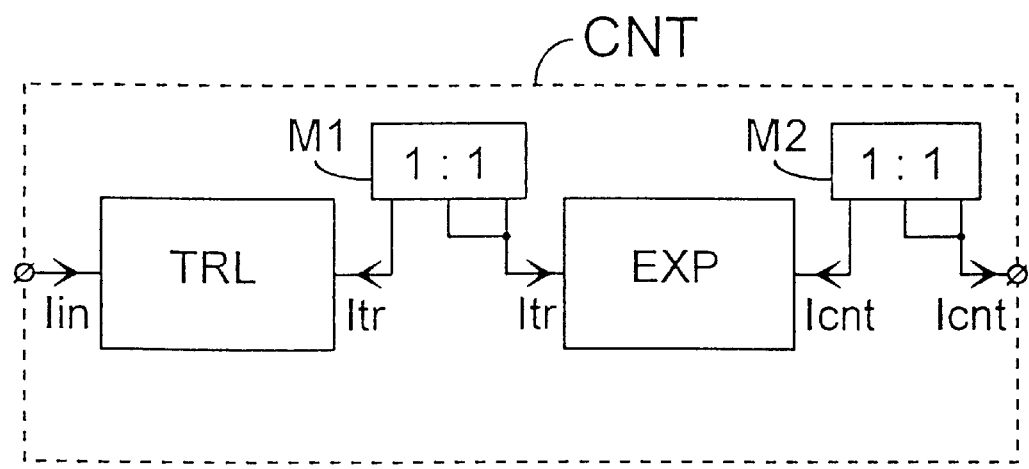
FIG. 2 presents an electric circuit diagram describing the structure of a control module included in a telephony device according to an embodiment of the invention.

FIG. 2 diagrammatically shows a control module CNT included in a telephony device according to the invention. This control module comprises:

- a translinear module TRL, having an input which forms the input of the control module CNT, and an output intended to produce a translinear current Itr whose value may be expressed in the form of a linear equation of the inverse value of the input signal, and
- an exponential module EXP, having an input intended to receive the translinear current Itr, and an output which forms the output of the control module CNT and is intended to deliver a current Icnt whose value, may be expressed proportionally to the exponential of the value of the translinear current Itr.

In the particular embodiments described herein, the currents Itr and Icnt produced on the output of the translinear and exponential modules, TRL and EXP respectively, are input currents. Current mirrors M1 and M2 are thus used for generating copies of said currents in view of their use by elements arranged after the said modules.

Figure 3:
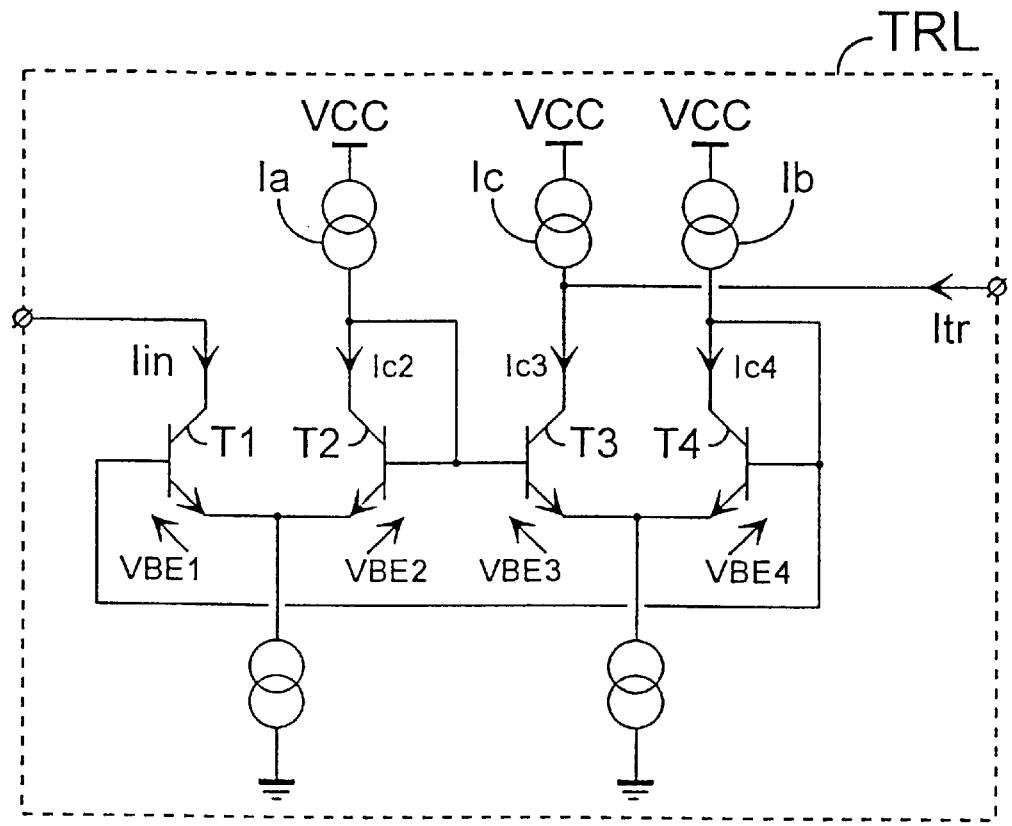
FIG. 3 presents an electric circuit diagram describing a translinear module included in a telephony device according to a particular embodiment of the invention.

FIG. 3 diagrammatically shows a translinear module TRL according to a particular embodiment of the invention. This translinear module comprises a first and a second transistor T1 and T2 arranged as a differential pair, and a third and a fourth transistor T3 and T4 arranged as a differential pair. The collectors of the first and third transistors T1 and T3 form the input and the output respectively, of the translinear module TRL and are fed by the respective currents Iin and Itr. The collectors of the second and fourth transistors T2 and T4 are connected to a first and a second current source Ia and Ib, respectively. The collector of the third transistor T3 is further connected to a third current source Ic. The bases of the first and fourth transistors T1 and T4 are together connected to the collector of the fourth transistor T4. The bases of the second and third transistors T2 and T3 are collectively connected to the collector of the second transistor T2. The equation of the translinear current Itr may be determined as follows: the sum of the base-emitter voltages VBE is zero. This is written as VBE1−VBE2+VBE3−VBE4=0. The transistors T1, T2, T3 and T4 are supposed to be identical except for negligible variations caused by the manufacturing process. Consequently, Iin/Ic2=Ic4/Ic3, or also Ic3=Ic2.Ic4/Iin. By discarding the base currents in front of the collector currents, this gives Ic3=Ia.Ib/Iin. Moreover, Itr=Ic3−Ic, which provides the equation of the translinear current Itr=(Ia.Ib/Iin)−Ic. It is indeed a linear equation of the inverse of the information current Iin.

Figure 4:
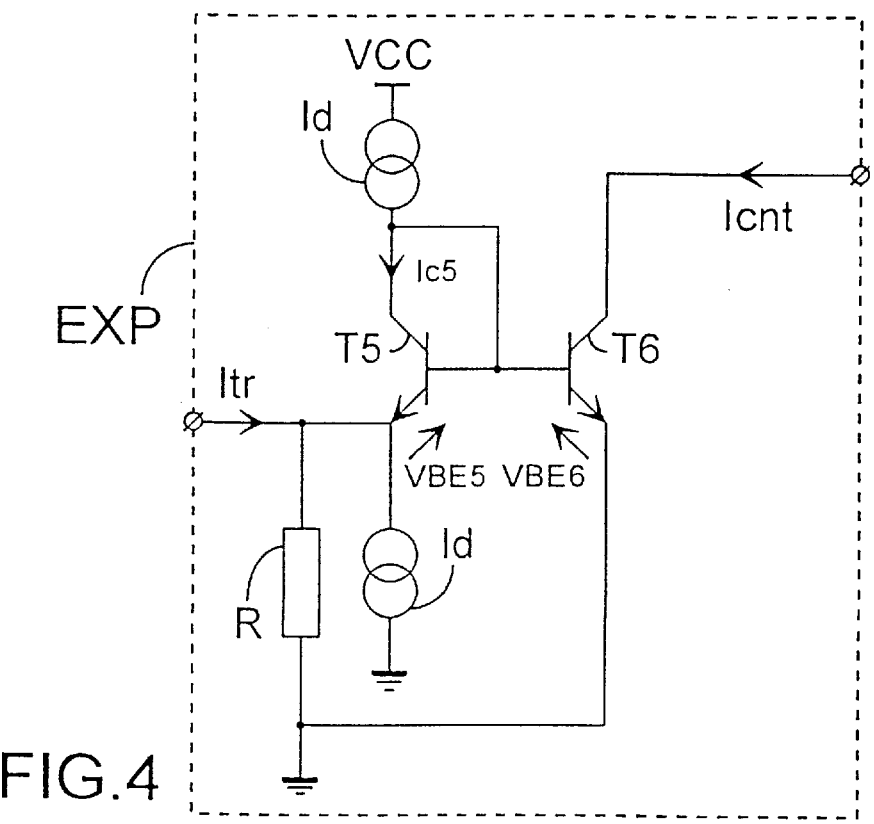
FIG. 4 presents an electric circuit diagram describing an exponential module included in a telephony device according to a particular embodiment of the invention.

FIG. 4 diagrammatically shows an exponential module EXP according to a particular embodiment of the invention.

This exponential module comprises two transistors T5 and T6 whose emitters are connected to the terminals of a resistor R. One of the terminals of this resistor R forms the input of the exponential module EXP, intended to receive the translinear current Itr, the other terminal being connected to a fixed-potential terminal, here the ground terminal of the circuit. The bases of the transistors T5 and T6 are collectively connected to the collector of the transistor T5. The collector and the emitter of the transistor T5 are connected to two current sources intended to supply and sink currents having the same nominal value Id so that exactly the current Itr flows in resistor R. The collector of the transistor T6 forms the output of the exponential module and produces the control current Icnt. The equation of this control current Icnt may be determined as follows: the sum of the base-emitter voltages VBE and of the voltage on the terminals of the resistor R is zero. This is written as: VBE6=VBE5+R.Itr. The transistors T5 and T6 are supposed to be identical except for negligible variations caused by the manufacturing process. In consequence, Vt.ln(Icnt/Ic5)=R.Itr which may be written in the form of Icnt=Ic5.exp(R.Itr/Vt). If the base currents are considered negligibly small compared to the collector currents, the equation obtained of the current produced on the output of the exponential module is: Icnt= Id.exp(R.Itr/Vt). If the translinear current comes from a translinear module such as described above, this yields:

*Icnt=Id.exp(R.((Ia.Ib/Iin)−Ic)/Vt).*

The term Vt introduces a dependence on the variations of temperature, since Vt=k.T/q. Advantageously, one may eliminate this temperature dependence by choosing for realizing the third current source Ic, and for realizing the first or the second current source Ia or Ib, sources of the PTAT type, that is to say, arranged for supplying a current whose value is proportional to the value of the absolute temperature to which they are subjected. The structure of this type of current source is well known to the expert. The output current Is of such a current source is proportional to Vt. The equation of the control current Icnt thus obtained is of the form of Icnt=K.exp((K'2/Iin)−K'3), in which all the parameters are independent of temperature.

We claim:

1. A telephony device comprising:
    a rectifier bridge having two AC terminals intended to be connected to a telephone line and two DC terminals intended to supply and receive respectively, a rectified line current;
    an interface module connected between the DC terminals of the rectifier bridge, having at least one input intended to receive a signal to be transmitted in the direction of the telephone line, and an output intended to supply an information signal whose value represents the mean value of the line current;
    an amplifier having a signal input intended to receive a signal to be transmitted to the telephone line, an output connected to the input of the interface module and a control input intended to receive a control signal, the amplifier having a value of gain which is proportional to the value of the control signal; and
    a control module which has an input intended to receive an input signal and connected to the output of the interface module, and an output connected to the control input of the amplifier, said output being intended to supply a signal whose value may be expressed proportionally to the exponential of a linear equation of the inverse of the input signal value, said control module comprising:
    a translinear module having an input which forms the input of the control module and an output intended to produce a translinear signal whose value may be expressed in the form of a linear equation of the inverse of the value of the input signal; and
    an exponential module having an input intended to receive the translinear signal and an output forming the output of the control module, which output is intended to supply a signal whose value may be expressed proportionally to the exponential of the value of the translinear signal.

2. The telephony device as claimed in claim 1, wherein the translinear module comprises a first and a second transistor arranged as a differential pair, and a third and a fourth transistor arranged as a differential pair, the collectors of the first and third transistors forming the input and output respectively, of the translinear module, the collectors of the second and fourth transistors being connected to a first and a second current source respectively, the collector of the third transistor being further connected to a third current source, the bases of the first and fourth transistors being connected together to the collector of the fourth transistor, the bases of the second and third transistors being connected together to the collector of the second transistor.

3. The telephony device as claimed in claim 2, wherein the third current source and one of the first and second current sources are arranged for supplying a current whose value is proportional to the value of the absolute temperature to which they are subjected.

4. A telephony device as claimed in claim 1, wherein the exponential module comprises two transistors whose emitters are connected to the terminals of a resistor, one of the terminals forming the input of the exponential module, the other terminal being connected to a fixed-potential terminal, the bases of the transistors being collectively connected to the collector of one of the transistors whose collector and emitter are connected to two current sources intended to supply currents which have the same nominal value, the collector of the other transistor forming the output of the exponential module.

5. A telephony device as claimed in claim 2, wherein the exponential module comprises two transistors whose emitters are connected to the terminals of a resistor, one of the terminals forming the input of the exponential module, the other terminal being connected to a fixed-potential terminal, the bases of the transistors being collectively connected to the collector of one of the transistors whose collector and emitter are connected to two current sources intended to supply currents which have the same nominal value, the collector of the other transistor forming the output of the exponential module.

6. A telephony device as claimed in claim 3, wherein the exponential module comprises two transistors whose emitters are connected to the terminals of a resistor, one of the terminals forming the input of the exponential module, the other terminal being connected to a fixed-potential terminal, the bases of the transistors being collectively connected to the collector of one of the transistors whose collector and emitter are connected to two current sources intended to supply currents which have the same nominal value, the collector of the other transistor forming the output of the exponential module.

* * * * *